United States Patent [19]

Mautner et al.

[11] Patent Number: 5,223,586
[45] Date of Patent: Jun. 29, 1993

[54] ELASTOMERIC GRAFT COPOLYMERS HAVING A CORE/SHELL STRUCTURE

[75] Inventors: Konrad Mautner, Burgkirchen; Bernward Deubzer, Burghausen, both of Fed. Rep. of Germany

[73] Assignee: Wacker-Chemie GmbH, Munich, Fed. Rep. of Germany

[21] Appl. No.: 806,505

[22] Filed: Dec. 13, 1991

[30] Foreign Application Priority Data

Dec. 20, 1990 [DE] Fed. Rep. of Germany ....... 4040986

[51] Int. Cl.$^5$ ............................................ C08F 283/12
[52] U.S. Cl. .................................. 525/477; 525/479; 525/63; 525/902; 528/25; 528/26
[58] Field of Search ............... 525/479, 902, 477, 63; 528/25, 26; 524/837, 865, 500

[56] References Cited

U.S. PATENT DOCUMENTS

| | | | |
|---|---|---|---|
| 4,690,986 | 9/1987 | Sasaki et al. | 525/479 |
| 4,812,515 | 3/1989 | Kress et al. | 525/69 |
| 4,859,740 | 8/1989 | Damrath et al. | 525/100 |
| 4,861,831 | 8/1989 | Damrath et al. | 528/100 |
| 4,865,917 | 9/1989 | Lindner et al. | 428/407 |
| 4,885,209 | 12/1989 | Lindner et al. | 428/420 |

FOREIGN PATENT DOCUMENTS 308198  3/1989  European Pat. Off. .

*Primary Examiner*—Ralph H. Dean, Jr.

[57] ABSTRACT

Elastomeric particulate copolymers having a core/shell structure composed of a core (a) comprising an organosilicon polymer and an organopolymeric shell (c) or two shells (b) and (c), the inner shell (b) comprising an organosilicon polymer, and the copolymer being composed of (a) from 0.05 to 95 percent by weight, based on the total weight of the copolymer, of a core polymer $(R_2SiO_{2/2})_x.(RSiO_{3/2})_y.(SiO_{4/2})_z$ where $x=0$ to 99.5 mol%, $y=0.5$ to 100 mol% and $z=0$ to 50 mol%, (b) from 0 to 94.5 percent by weight, based on the total weight of the copolymer, of a polydialkylsiloxane shell comprising $(R_2SiO_{2/2})$ units, and (c) from 5 to 95 percent by weight, based on the total weight of the copolymer, of a shell comprising an organopolymer of monoolefinically unsaturated monomers, and the particles have a particle size of from 10 to 300 nm and a monomodal particle size distribution having a maximum polydispersity index $\sigma_2=0.2$.

The invention furthermore relates to a process for preparing the graft copolymers.

The graft copolymers of this invention are particularly suitable for use as modified thermoplastics or for use as additives for modifying polymers.

6 Claims, No Drawings

ELASTOMERIC GRAFT COPOLYMERS HAVING A CORE/SHELL STRUCTURE

The invention relates to elastomeric graft copolymers having a core/shell structure composed of a core (a) comprising an organosilicon polymer and an organopolymeric shell (c) or two shells (b) and (c), in which the inner shell (b) comprises an organosilicon polymer. These polymers have a defined particle size and a monomodal particle size distribution.

BACKGROUND OF THE INVENTION

Graft copolymers having a core/shell structure composed of an organosilicon polymer component and an organic polymer component are described in a number of publications.

DE-B 1595554 (U.S. Pat. No. 3,445,415) discloses a process for preparing aqueous graft polymer latices in which monoolefinically unsaturated monomers are grafted onto organosiloxane polymers comprising units of the general formula $RSiO_{3/2}$. In this process only hard polymers and not graft copolymers having elastomeric properties can be prepared.

DE-B 2421288 (U.S. Pat. No. 3,898,300) describes a process for preparing graft copolymers in which styrene and other monoethylenically unsaturated compounds are grafted onto a polyorganosiloxane graft base. To this end, emulsions containing mixtures of polyorganosiloxanes or mixtures of polyorganosiloxanes and organosiloxanes are homogenized using a homogenizer and subsequently grafted with the organic monomers. In this complex process, only polydispersed graft copolymer dispersions having a broad particle size distribution can be obtained. The preparation of graft copolymers having a monomodal particle size distribution and having particle sizes of $<0.1$ $\mu$m is not possible using this process.

Graft copolymers comprising undefined organopolysiloxane or silicone rubber and vinyl or acrylic monomers are described in DE-A 2539572. In the polymerization, the mixture is stirred using high-speed stirrers. A polydispersed product having particle sizes of between 1 and 3 mm is obtained.

DE-A 3629763 (EP-A 258746) describes silicone rubber graft copolymers with vinyl or acrylic monomers, in which the silicone rubber phase is at least partially crosslinked. Although, in the preparation of the graft base, the batch is already homogenized, the particle size of the graft base is already 300 nm. Homogenization results in a polydispersed particle size distribution.

EP-A 254418 relates, inter alia, to silicone graft copolymers obtained by grafting acrylates onto dispersed silicone elastomers. The particle size of the graft copolymers obtainable in this manner is 0.14 $\mu$m. Monomodal graft copolymers are not described.

EP-A 231776 describes a mixture containing polyester and polysiloxane graft copolymers. The polysiloxane is prepared by emulsion polymerization of the monomeric silanes after prior homogenization using an Ultraturrax or a homogenizer. The polysiloxane graft base is subsequently grafted with vinyl monomer. The polyorganosiloxane graft copolymers described in U.S. Pat. No. 4,690,986 are prepared by the same method. The particle size of the graft copolymers in the Examples is 300 nm due to the homogenization. A polydispersed particle size distribution is obtained.

Particulate graft copolymers having a core/shell structure and containing polysiloxanes or silicones and more than one shell are described in DE-A 3617267 (EP-A 246537), DE-A 3631539 (U.S. Pat. No. 4,812,515), EP-A 296402 (U.S. Pat No. 4,865,917) and in EP-A 296403 (U.S. Pat. No. 4,885,209). The siloxane or silicone rubber graft base is prepared in all cases after a homogenization step, which results in a polydispersed particle size distribution.

DE-A 3617267 and DE-A 3631539 describe a graft copolymer having a silicone rubber core, a first shell of acrylate rubber and a grafted-on shell of monoethylenically unsaturated monomers.

EP-A 296402 and EP-A 296403 relate to silicone rubber graft copolymers comprising a rubber-like organopolymer core having a shell of organopolysiloxane, onto which ethylenically unsaturated monomers are grafted.

Therefore, it is an object of the present invention to provide finely divided elastomeric graft copolymers containing organosilicon and organic polymers and having a monomodal particle size distribution. Another object of the present invention is to provide a process for preparing graft copolymers which does not utilize any complex mechanical emulsification or homogenization steps, and can be used to modify the particle size without using additional emulsifier. A further object of the present invention is to provide a process for preparing graft copolymers in which grafting takes place to an adequate extent, even without a functional silane component in the core.

SUMMARY OF THE INVENTION

The foregoing objects and others which will become apparent from the following description are accomplished in accordance with this invention, generally speaking by providing elastomeric particulate copolymers having a core/shell structure composed of a core (a) comprising an organosilicon polymer and an organopolymeric shell (c) or two shells (b) and (c), the inner shell (b) comprising an organosilicon polymer, in which the copolymer is composed of (a) from 0.05 to 95 percent by weight, based on the total weight of the copolymer, of a core polymer of the general formula

$$(R_2SiO_{2/2})_x \cdot (RSiO_{3/2})_y \cdot (SiO_{4/2})_z$$

where $x=0$ to 99.5 mol%, $y=0.5$ to 100 mol% and $z=0$ to 50 mol%, (b) from 0 to 94.5 percent by weight, based on the total weight of the copolymer, of a polydialkylsiloxane shell comprising $(R_2SiO_{2/2})$ units and (c) from 5 to 95 percent by weight, based on the total weight of the copolymer, of a shell comprising an organopolymer of monoolefinically unsaturated monomers, where R represents the same or different monovalent alkyl or alkenyl radicals having 1 to 6 carbon atoms, aryl radicals or substituted hydrocarbon radicals, and the particles have a particle size of from 10 to 300 nm and a monomodal particle size distribution having a maximum polydispersity index $\sigma_2 = 0.2$.

DESCRIPTION OF THE INVENTION

Particulate copolymers comprising a core (a) and a shell (c) are preferably composed of (a) from 5 to 95 percent by weight, and more preferably from 20 to 80 percent by weight, based on the total weight of the copolymer, of a core polymer $$(R_2SiO_{2/2})_x \cdot (RSiO_{3/2})_y \cdot (SiO_{4/2})_z$$

where $x = 10$ to 99.5 mol%, and more preferably 50 to 99 mol%; $y = 0.5$ to 95 mol%, in particular 1 to 50 mol%; $z = 0$ to 30 mol%, and more preferably 0 to 20 mol%; and (c) from 5 to 95 percent by weight, and more preferably from 20 to 80 percent by weight, based on the total weight of the copolymer, of a shell comprising an organopolymer of monoolefinically unsaturated monomers, where R represents the same or different monovalent alkyl or alkenyl radicals having 1 to 6 carbon atoms, aryl radicals or substituted hydrocarbon radicals.

Particulate copolymers comprising a core (a), an inner shell (b) and a shell (c) are preferably composed of: (a) from 0.05 to 90 percent by weight, and more preferably from 0.1 to 35 percent by weight, based on the total weight of the copolymer, of a core polymer $(RSiO_{3/2})_y \cdot (SiO_{4/2})_z$ where $y = 50$ to 100 mol% and $z = 0$ to 50 mol%, and more preferably 0 to 30 mol%, (b) from 0.5 to 94.5 percent by weight, and more preferably from 35 to 70 percent by weight, based on the total weight of the copolymer of a polydialkylsiloxane shell comprising $(R_2SiO_{2/2})_n$ units, and (c) from 5 to 95 percent by weight, and more preferably from 30 to 70 percent by weight, based on the total weight of the copolymer, of a shell comprising an organopolymer of monoolefinically unsaturated monomers, where R represents the same or different monovalent alkyl or alkenyl radicals having 1 to 6 carbon atoms, aryl radicals or substituted hydrocarbon radicals.

The radicals R are preferably alkyl radicals, such as the methyl, ethyl, n-propyl, isopropyl, n-butyl, sec-butyl, amyl and hexyl radicals; alkenyl radicals, such as the vinyl, allyl and butenyl radicals; aryl radicals, such as the phenyl radical; or substituted hydrocarbon radicals. Examples of other R radicals are halogenated hydrocarbon radicals, such as the chloromethyl, 3-chloropropyl, 3-bromopropyl, 3,3,3-trifluoropropyl and 5,5,5,4,4,3,3-heptafluoropentyl radicals, and chlorophenyl radicals; mercaptoalkyl radicals, such as the 2-mercaptoethyl and 3-mercaptopropyl radicals; cyanoalkyl radicals, such as the 2-cyanoethyl and 3-cyanopropyl radicals; aminoalkyl radicals, such as the 3-aminopropyl radical; acyloxyalkyl radicals, such as the 3-acryloxypropyl and 3-methacryloxypropyl radicals; and hydroxyalkyl radicals, such as the hydroxypropyl radical.

Particularly preferred is the methyl, ethyl, propyl, phenyl, vinyl, 3-methacryloxypropyl and 3-mercaptopropyl radicals, in which less than 30 mol% of the radicals in the siloxane polymer are vinyl, 3-methacryloxypropyl or 3-mercaptopropyl groups.

The organosilicon shell polymer (b) preferably comprises dialkylsiloxane units $(R_2SiO_{2/2})$ where R is methyl or ethyl.

Preferred monomers of the organic polymer component (c) are acrylates or methacrylates of aliphatic alcohols having 1 to 10 carbon atoms, acrylonitrile, styrene, p-methylstyrene, α-methylstyrene, vinyl acetate, vinyl propionate, maleimide, vinyl chloride, ethylene, butadiene, isoprene and chloroprene. Particularly preferred is the styrene and acrylates and methacrylates of aliphatic alcohols having 1 to 4 carbon atoms, for example methyl (meth)acrylate, ethyl (meth)acrylate or butyl (meth)acrylate. Suitable organic polymer components are homopolymers or copolymers of said monomers.

The finely divided elastomeric graft copolymers have a mean particle size (diameter) of from 10 to 300 nm, preferably from 30 to 150 nm, measured using a transmission electron microscope. The particle size distribution is very uniform, and the graft copolymers are in monomodal form, i.e., the particles have a maximum in the particle size distribution and a maximum polydispersity factor $\sigma_2$ of 0.2, measured using the transmission electron microscope.

The polysiloxane graft base is prepared by the emulsion polymerization process by metering from 0.05 to 95 percent by weight, based on the total weight of the graft copolymer to be prepared, of a monomeric silane of the $RSi(OR')_3$ type or a mixture of monomeric silanes of the $R_aSi(OR')_{4-a}$ type where $a = 0$, 1 or 2, into an agitated emulsified/water mixture, in which the radical R is the same as above. The radical R' is an alkyl radical having 1 to 6 carbon atoms, an aryl radical or a substituted hydrocarbon radical, preferably the methyl, ethyl or propyl radical.

Suitable emulsifiers are carboxylic acids having 9 to 20 carbon atoms, aliphatically substituted benzenesulfonic acids having at least 6 carbon atoms in the aliphatic substituents, aliphatically substituted naphthalenesulfonic acids having at least 4 carbon atoms in the aliphatic substituents, aliphatic sulfonic acids having at least 6 carbon atoms in the aliphatic radicals, silylalkylsulfonic acids having at least 6 carbon atoms in the alkyl substituents, aliphatically substituted diphenyl ether sulfonic acids having at least 6 carbon atoms in the aliphatic radicals, alkyl hydrogen sulfates having at least 6 carbon atoms in the alkyl radical, and quaternary ammonium halides or hydroxides. All the acids can be used as such or, if desired, mixed with their salts. If anionic emulsifiers are employed, it is preferred to use those whose aliphatic substituents contain at least 8 carbon atoms. Preferred anionic emulsifiers are aliphatically substituted benzenesulfonic acids. If cationic emulsifiers are used, it is preferred to employ halides. The amount of the emulsifier to be employed is from 0.5 to 20.0 percent by weight, preferably from 1.0 to 3.0 percent by weight, based on the amount of organosilicon compounds employed.

The silane or the silane mixture is added at a metered rate. The emulsion polymerization is carried out at a temperature of from 30° to 90° C., preferably from 60° to 85° C., and preferably at atmospheric pressure. The pH of the polymerization mixture is from 1 to 4, preferably from 2 to 3.

The polymerization for the preparation of the graft base can be carried out either continuously or batchwise; it is preferably carried out batchwise.

In the continuous process, the residence time in the reactor is between 30 and 60 minutes. In the batchwise process for preparing the graft base, it is preferred that stirring of the emulsion be continued from 0.5 to 5.0 hours after the metered addition is complete in order to improve the stability. In order to further improve the stability of the polysiloxane emulsion, the alcohol liberated on hydrolysis, in particular if the proportion of silane of the general formula $RSi(OR')_3$ is high, is removed by distillation.

In the first reaction step, the composition containing the silane phase, which comprises one or more components and is to be metered in an amount of from 0.05 to 95 percent by weight, based on the total weight of the graft copolymer, comprises from 0 to 99.5 mol% of a silane of the general formula $R_2Si(OR')_2$ or of an oligomer of the formula $(R_2SiO)_n$ where n is from 3 to 8, from 0.5 to 100 mol% of a silane of the general formula $RSi(OR')_3$ and from 0 to 50 mol% of a silane of the general formula $Si(OR')_4$, in which the mol% in each case is based on the total composition of the graft base.

In order to prepare graft copolymers comprising a core (a) and a shell (c), preferably from 10 to 99.5 mol%, and more preferably from 50 to 99 mol%, of silane of the general formula $R_2Si(OR')_2$ or of an oligomer of the formula $(R_2SiO)_n$ where n is from 3 to 8, from 0.5 to 90 mol%, and more preferably from 1 to 50 mol%, of silanes of the general formula $RSi(OR')_3$ and from 0 to 30 mol%, and more preferably from 0 to 20 mol%, of silanes of the general formula $Si(OR')_4$ are metered in the first reaction step, in which the mol% in each case is based on the total composition of the graft base.

In order to prepare graft copolymers comprising a core (a), an inner shell (b) and a shell (c), preferably from 50 to 100 mol% of silanes of the general formula $RSi(OR')_3$ and preferably from 0 to 50 mol%, and more preferably from 0 to 30 mol%, of silanes of the general formula $Si(OR')_4$ are metered in the first reaction step, in which the mol% in each case is based on the total composition of the graft base.

Examples of silanes of the general formula $R_2Si(OR')_2$ are dimethyldiethoxysilane and dimethyldimethoxysilane. Examples of oligomers of the formula $(R_2SiO)_n$ where n is from 3 to 8 are octamethylcyclotetrasiloxane and hexamethylcyclotrisiloxane.

Examples of silanes of the general formula $RSi(OR')_3$ are methyltrimethoxysilane, phenyltriethoxysilane, 3-chloropropyltrimethoxysilane, 3-mercaptopropyltrimethoxysilane, and methacryloxypropyltrimethoxysilane.

Examples of silanes of the general formula $Si(OR')_4$ are tetramethoxysilane and tetraethoxysilane.

In a preferred embodiment, the graft base is also grafted with the organosilicon shell polymer (b) before the monoethylenically unsaturated monomers are grafted on. Shell (b) is likewise prepared by the emulsion polymerization process. To this end, difunctional silanes of the general formula $R_2Si(OR')_2$ or low-molecular-weight siloxanes of the general formula $(R_2SiO_{2/2})_n$ where n is from 3 to 8 are metered into the agitated emulsion of the graft base. The radicals R and R' are the same as above. It is preferred that no additional emulsifier be added since the amount of emulsifier present in the emulsion of the graft base is sufficient of stabilization.

The polymerization for the grafting-on of the shell (b) is carried out at a temperature of from 15° to 90° C., preferably at from 60° to 85° C., and more preferably at atmospheric pressure. The pH of the polymerization mixture is from 1 to 4, and more preferably from 2 to 3. This reaction step can also either be carried out continuously or batchwise. The residence times in the reactor in the case of the continuous process or the subsequent stirring times in the reactor in the case of the batchwise process depend on the amount of silanes or siloxanes metered in and are preferably from 2 to 6 hours. It is most expedient to combine the reaction steps for the preparation of the graft base (a) and of the shell polymer (b) in a suitable reactor and, if necessary, to remove the alcohol formed by distillation at the end.

The difunctional silanes of the general formula $R_2Si(OR')_2$ or low-molecular-weight siloxanes of the general formula $(R_2SiO_{2/2})_n$ where n is from 3 to 8 are metered in in such an amount that the proportion of organosilicon shell polymer is from 0.5 to 94.5 percent by weight, and more preferably from 35 to 70 percent by weight, based on the total weight of the graft copolymer.

The solids content of the siloxane elastomer sols prepared in this manner should be at most 25 percent by weight, either with or without organosilicon shell polymer (b), since otherwise a considerable increase in viscosity makes further processing of the sols as the graft base more difficult. Polysiloxanes obtainable from such sols by coagulation have elastomeric properties. A simple method for characterizing the elasticity is the determination of the swelling factor in accordance with the method described in U.S. Pat. No. 4,775,712. The swelling factor should have a value of >3.

In the final step of the process, the above mentioned monoethylenically unsaturated monomers are grafted onto the polysiloxane graft base, which is preferably grafted with the organosilicon shell polymer (b). To this end, the organic monomers are metered in in an amount of from 5 to 95 percent by weight, preferably from 30 to 70 percent by weight, based on the total weight of the graft copolymer. The grafting is carried out by the emulsion polymerization process in the presence of water-soluble or monomer-soluble free-radical initiators. Suitable free-radical initiators are water-soluble peroxo compounds, organic peroxides, hydroperoxides or azo compounds. Particular preference is given to redox catalysis, for example using $K_2S_2O_8$ and $KHSO_3$. In this case, the oxidation and reduction components are employed in an amount of from 0.01 to 2 percent by weight, based on the amount of monomer.

The reaction temperatures depend on the type of initiator used and are from 15° to 90° C., and more preferably from 30° to 85° C. In order to avoid hydrolysis, especially in the case of esterfunctional monomers, the pH should be adjusted to pH 4 to 6. Again in this reaction step, it is preferred that no additional emulsifier be added in addition to the emulsifier added in the first step. An excessive emulsifier concentration can result in micro-emulsion-free micelles, which can function as nuclei for purely organic latex particles. This reaction step can likewise be carried out either continuously or batchwise.

The graft copolymers of this invention can be isolated from the emulsion by known processes, such as, for example by coagulation of the latices by adding salts or by addition of polar solvents or by spray drying.

Using the procedure of this invention, the particle size can be influenced not only via the emulsifier content, but also via the reaction temperature, the pH and in particular via the composition of the graft copolymers. The average particle size can be varied from 10 to 300 nm. Thus, in the first process step in the preparation of the organosilicon graft base (a), if the content of tertiary silane units $(RSiO_{3/2})$ is high, particles are obtained having particle sizes which, by using the processes disclosed heretofore, were only obtainable, if at all, using large amounts of emulsifier. The introduction of an organosilicon shell (b) provides improved phase binding of the organopolymer shell (c) to the organosilicon graft base.

The graft copolymers of this invention are particularly suitable for use as modified thermoplastics or for use as additives for polymer modification. If the graft copolymers are employed per se as elastomeric thermoplastics, the content of elastomeric polysiloxane should not exceed 40% by weight. Furthermore, the graft copolymers according to this invention exhibit or cause improved mechanical properties, such as weathering and aging resistance, heat resistance, notched impact strength and low-temperature toughness.

The examples below serve to further illustrate the invention.

EXAMPLE 1

Preparation of the graft base

About 3800 g of water and 19 g (1.9% by weight, based on Si compounds) of dodecylbenzenesulfonic acid were warmed to 85° C. A mixture containing 855 g (2.9 mol, 74 mol%) of octamethylcyclotetrasiloxane, 97 g (0.7 mol, 18 mol%) of methyltrimethoxysiloxane and 66 g (0.3 mol, 8 mol%) of methacryloxypropyltrimethoxysilane were metered in, and the mixture was stirred at 85° C. for an additional 4 hours. After about 400 g of distillate had been removed, a dispersion having a solids content of 21 percent by weight and a particle size of 111 nm was obtained. Grafting:

About 13,050 g of the dispersion were rendered inert with nitrogen in a 15 liter reactor and adjusted to pH 4. About 90 g of methyl methacrylate were metered in, and the polymerization was initiated by addition of 5.2 g (0.6% by weight, based on the monomer) of $K_2S_2O_8$ and 18 g (2.1% by weight, based on the monomer) of $NaHSO_3$ (37% by weight in water). An additional 780 g of methyl methacrylate were metered in over a period of 1 hour, and the mixture was subsequently heated to 65° C. and polymerized to completion over a period of 3 hours. A latex containing 24% by weight of polymethyl methacrylate in the graft copolymer and having a solids content of 26.7% by weight, a particle size of 127 nm and a polydispersity index of $\sigma_2=0.02$ was obtained.

EXAMPLE 2

Preparation of the graft base

About 4035 g of water and 8 g (1.8 percent by weight, based on Si compounds) of dodecylbenzenesulfonic acid were warmed to 80° C. About 145 g (0.7 mol, 39 mol%) of phenyltrimethoxysilane were metered in over a period of 30 minutes, and 310 g (1.1 mol, 61 mol%) of octamethylcyclotetrasiloxane were subsequently metered in over a period of 2 hours. The mixture was stirred for an additional hour at 80° C., and the volume was subsequently reduced to the initial value by distillation. Grafting:

About 500 g of the hydrosol having a solids content of 9.2 percent and a particle size of 83 nm were adjusted to pH 5 using sodium carbonate solution and saturated with nitrogen. About 7 g of freshly washed methyl methacrylate were added, and the polymerization was initiated by addition of 0.09 g (0.13 percent by weight, based on the monomer) of $K_2S_2O_8$ and 0.12 g (0.16 percent by weight, based on the monomer) of $NaHSO_3$ (37 percent by weight in water). An additional 62 g of methyl methacrylate were then metered in over a period of 30 minutes, and the mixture was subsequently heated to 65° C. and polymerized to completion over a period of 3 hours. A latex containing 60 percent by weight of polymethyl methacrylate in the graft copolymer and having a solids content of 23.1 percent by weight, a particle size of 106 nm and a polydispersity index of $\sigma_2=0.01$ was obtained.

EXAMPLE 3

Preparation of the graft base

About 300 g of water and 12 g (1.9 percent by weight, based on Si compounds) of dodecylbenzenesulfonic acid were warmed to 90° C. About 576 g (2.0 mol, 86 mol%) of octamethylcyclotetrasiloxane, 22.6 g (0.15 mol, 6 mol%) of vinyltrimethoxysilane and 24.5 g (0.18 mol, 8 mol%) of methyltrimethoxysilane were added dropwise at 90° C. over a period of 4 hours, and the mixture was stirred for an additional 4 hours at 90° C., during which the methanol produced was removed by distillation.

Grafting

The mixture was cooled, adjusted to pH 5 using a sodium carbonate solution and saturated with nitrogen. About 42 g of methyl methacrylate and 93 g of butyl acrylate were added, and the polymerization was initiated by addition of 1.75 g (0.13 percent by weight, based on the monomer) of $K_2S_2O_8$ and 2.15 g (0.16 percent by weight, based on the monomer) of $NaHSO_3$ (37 percent by weight in water). An additional 376 g of methyl methacrylate and an additional 834 g of butyl acrylate were then metered in over a period of 30 minutes, and the mixture was subsequently heated to 65° C. and polymerized to completion over a period of 3 hours. A latex having a solids content of 43.3 percent by weight, a particle size of 131 nm and a polydispersity index of $\sigma_2=0.03$ was obtained.

EXAMPLE 4

Preparation of the graft base

About 11,830 g of water and 59.2 g (1.9 percent by weight, based on Si compounds) of dodecylbenzenesulfonic acid were introduced into a 15 liter reactor and warmed to 85° C. About 302 g (2.2 mol, 73 mol%) of methyltrimethoxysilane and 206 g (0.8 mol, 27 mol%) of methacryloxypropyltrimethoxysilane were metered in with stirring, and the mixture was stirred for an additional 0.5 hour.

Grafting of shell (b)

About 2662 g of octamethylcyclotetrasiloxane were subsequently metered in at 85° C., and the mixture was stirred for an additional 4 hours. After 1500 g of distillate had been removed, a dispersion having a mean particle size of 145 nm and a solids content of 21.7 percent by weight was obtained.

Grafting of shell (c)

About 6450 g of the dispersion were adjusted to pH 4 and rendered inert with nitrogen. About 40 g of methyl methacrylate were added with stirring, and the polymerization was initiated using 2.5 g (0.6 percent by weight, based on the monomer) of $K_2S_2O_8$ and 8.7 g (2.1 percent by weight, based on the monomer) of $NaHSO_3$ (37 percent by weight in water). After an additional 380 g of methyl methacrylate had been added over a period of 0.5 hour, the mixture was warmed to 65° C. and polymerized to completion over a period of 3 hours. A latex containing 23 percent by weight of polymethyl methacrylate in the graft copolymer and having a solids content of 26.2 percent by weight and a mean particle size of 155 nm and a polydispersity index of 0.04 was obtained.

EXAMPLE 5

Preparation of the graft base

About 91.8 g (0.7 mol, 88 mol%) of methyltrimethoxysilane and 17.2 g (0.1 mol, 12 mol%) of tetraethoxysilane were added dropwise over a period of 2 hours at 80° C. to 950 g of water and 1.0 g (0.9 percent by weight, based on Si compounds) of dodecylbenzenesulfonic acid, and the mixture was stirred for an additional 30 minutes.

Grafting of shell (b)

The temperature was subsequently raised to 90° C., and 80 g of octamethylcyclotetrasiloxane and 18 g of 10 percent dodecylbenzenesulfonic acid in water were metered in over a period of 1.5 hours, and the mixture was stirred for an additional 3.5 hours and reduced to its original volume by distillation. A hydrosol having a solids content of 12.7 percent and a mean particle size of 36 nm was obtained.

Grafting of shell (c)

About 800 g of the hydrosol were adjusted to pH 5 using sodium carbonate solution and saturated with nitrogen. About 3 g of freshly washed methyl methacrylate were added, and the polymerization was initiated by addition of 0.04 g (0.13 percent by weight, based on the monomer) of $K_2S_2O_8$ and 0.05 g (0.16 percent by weight, based on the monomer) of $NaHSO_3$ (37 percent strength by weight, based on the monomer) of $K_2S_2O_8$ and 0.05 g (0.16 percent by weight, based on the monomer) of $NaHSO_3$ (37 percent strength by weight of water). An additional 27.5 g of methyl methacrylate were then metered in over a period of 30 minutes, and the mixture was subsequently heated to 65° C. and polymerized to completion over a period of 3 hours. A latex containing 23 percent by weight of polymethyl methacrylate in the graft copolymer and having a solids content of 17 percent by weight, a particle size of 50 nm and a polydispersity index of $\sigma_2 = 0.02$ was obtained.

COMPARATIVE EXAMPLE 1

About 500 g of a silsesquioxane sol having a solids content of 18.7 percent by weight and a particle size of 54 nm were prepared from methyltrimethoxysilane in accordance with the process of U.S. Pat. No. 3,445,415 and rendered inert using nitrogen. About 2.8 g of freshly purified methyl methacrylate were subsequently metered in with stirring, and the polymerization was initiated by addition of 0.16 g (0.3 percent by weight, based on the monomer) of $K_2S_2O_8$ and 0.58 g (1.2 percent by weight, based on the nomomer) of $NaHSO_3$ (37 percent by weight in water). An additional 44 g of methyl methacrylate were metered in over a period of 30 minutes. When the metered addition was complete, the mixture was warmed to 65° C. and polymerized to completion over a period of 3 hours. A latex containing 31 percent by weight of polymethyl methacrylate in the graft copolymer and having a solids content of 23 percent by weight, a particle size of 72 nm and a polydispersity index of $\sigma_2 > 1.5$ was obtained.

COMPARATIVE EXAMPLE 2

About 540 g (1.8 mol, 72 mol%) of octamethylcyclotetrasiloxane, 61.3 g (0.5 mol, 20 mol%) of methyltrimethoxysilane, 41.7 g (0.2 mol, 8 mol%) of methacryloxypropyltrimethoxysilane, 12 g (1.8 percent by weight, based on Si compounds) of dodecylbenzenesulfonic acid and 2400 g of water were homogenized in accordance with the procedure of U.S. Pat. No. 4,690,986 and polymerized for 6 hours, the temperature having been increased to 90° C. An emulsion having a solids content of 19.3 percent by weight and a particle size distribution of from 15 to 170 nm resulted. Grafting with 280 g of methyl methacrylate, carried out as in the above examples, resulted in an emulsion containing 32.6 percent by weight of polymethyl methacrylate in the graft copolymer and having a solids content of 26.7 percent by weight, a particle size distribution of from 15 to 190 nm and a polydispersity index of $\sigma_2 > 1.5$. Applicational testing: The graft copolymers prepared in the examples and comparative examples were obtained as powders by coagulation or spray drying and tested for their ability to modify thermoplastics.

The parameters tested for the modifier action were the notched impact strength in accordance with the DIN 53453 standard and the impact strength in accordance with the DIN 55753 standard.

The thermoplastics employed were:

1. For testing the notched impact strength:
   Polyvinyl chloride in a composition comprising 100 parts of PVC (Type H 68 D, a suspension PVC from Wacker-Chemie GmbH), 4 parts of chalk filler (Type Chalk 95 T from Omya), 4 parts of $TiO_2$ filler (Type U 220 from Kronos) and 4 parts of Ca/Ba stabilizer (Type Stabilox VCZ 2040 from Ciba-Geigy). Polymethyl methacrylate (PMMA, Type Plexiglas 8H from Röhm GmbH.

2. For testing the impact strength:
   Styrene-acrylonitrile copolymer (SAN, Type Luran 386 R from BASF AG), Polystyrene (PS, Type 143 F from BASF AG) In the modification of PVC, a standard modifier for PVC, namely VK 704, was also employed for comparison. VK 704 is a graft copolymer of VC on polybutyl acrylate (50:50).

The notched impact strength test results in accordance with DIN 53453 are shown in Table 1. The impact strength test results in accordance with DIN 55753 are shown in Table 2.

Determination of the particle size and the polydispersity index $\sigma_2$ using the transmission electron microscope:

The curves for the diameter distribution, the surface area distribution and the volume distribution are determined for the individual samples using the transmission electron microscope with the computer unit connected thereto. The median for the particle size and its standard deviation o can be determined from the curve for the diameter distribution. The median for the mean volume V is obtained from the curve for the volume distribution. The median for the mean surface area A of the particles is obtained from the curve for the surface area distribution. The polydispersity index $\sigma_2$ can be calculated using the following formula:

$$\sigma_2 = \sigma/X_{3/2} \text{ where } X_{3/2} = V/A$$

According to P. Becher (Encyclopedia of Emulsion Technology, Vol. 1, page 71, Marcel Dekker, New York, 1983), a monomodal particle size distribution is present if the polydispersity index $\sigma_2$, calculated from the above mentioned formula, is less than 0.5.

The particle size and the polydispersity index were determined using a Phillips transmission electron microscope (Phillips CM 12) and a Zeiss evaluation unit (Zeiss TGA 10). The latex to be measured was diluted with water and applied to a standard copper mesh using a 1 μl inoculation loop.

| Thermoplastic (parts) | Modifier (parts) | Notched impact strength | | |
|---|---|---|---|---|
| | | $a_k23$ | $A_kO$ [kJ/m$^2$] | $a_k-20$ |
| 100 p. of PVC | | 6.7 | | |
| 114 p. of PVC | 15 p. of Comp. Ex. 1 | 5.6 | | |
| 114 p. of PVC | 30 p. of Comp. Ex. 1 | 3.9 | | |
| 114 p. of PVC | 12 p. of VK 704 | 45.6 | 9.5 | 6.0 |
| 114 p. of PVC | 9 p. of Ex. 4 | 38.1 | 10.3 | 7.2 |
| 100 p. of PMMA | | 1.5 | | |
| 100 p. of PMMA | 15 p. of Comp. Ex. 1 | 1.1 | | |
| 100 p. of PMMA | 30 p. of Comp. Ex. 1 | 0.7 | | |
| 100 p. of PMMA | 18 p. of Ex. 4 | 3.1 | | |

TABLE 2

| Thermoplastic (parts) | Modifier (parts) | Impact strength | |
|---|---|---|---|
| | | $a_k23$ [kJ/m$^2$] | $a_kO$ |
| 100 p. of SAN | | 8.8 | 11.0 |
| 100 p. of SAN | 10 p. of Comp. Ex. 2 | 9.7 | 12.3 |
| 114 p. of SAN | 18 p. of Ex. 4 | 8.9 | 10.0 |
| 100 p. of PS | | 3.7 | 3.4 |
| 100 p. of PS | 18 p. of Comp. Ex. 2 | 3.0 | 3.4 |
| 100 p. of PS | 18 p. of Ex. 4 | 7.5 | 5.7 |

What is claimed is:

1. An elastomeric particulate copolymer having a core/shell structure composed of a core (a) comprising an organosilicon polymer and an organopolymeric shell (c) or two shells (b) and (c), the inner shell (b) comprises an organosilicon polymer, in which the copolymer is composed of (a) from 0.05 to 95 percent by weight, based on the total weight of the copolymer, of a core polymer $(R_2SiO_{2/2})_x \cdot (RSiO_{3/2})_y \cdot (SiO_{4/2})_z$ where $x=0$ to 99.5 mol%, $y=0.5$ to 100 mol% and $z=0$ to 50 mol%, (b) from 0 to 94.5 percent by weight, based on the total weight of the copolymer, of a polydialkylsiloxane shell comprising $(R_2SiO_{2/2})$ units, and (c) from 5 to 95 percent by weight, based on the total weight of the copolymer, of a shell comprising an organopolymer of monoolefinically unsaturated monomers, in which R is selected from the group consisting of monovalent hydrocarbon radicals selected from the group consisting of alkyl radicals having from 1 to 6 carbon atoms, alkenyl radicals having from 2 to 6 carbon atoms, aryl radicals and substituted hydrocarbon radicals selected from the group consisting of halogenated hydrocarbon radicals, mercaptoalkyl radicals, cyanoalkyl radicals, aminoalkyl radicals, acryloxyalkyl radicals, methacryloxyalkyl radicals and hydroxyalkyl radicals, and the particles have a particle size of from 10 to 300 nm and a monomodal particle size distribution having a maximum polydispersity index $\sigma_2 = 0.2$.

2. The particulate copolymer of claim 1, which is composed of (a) from 0.05 to 90 percent by weight, based on the total weight of the copolymer, of a core polymer $(RSiO_{3/2})_y \cdot (SiO_{4/2})_z$ where $y=50$ to 100 mol% and $z=0$ to 50 mol%, (b) from 0.5 to 94.5 percent by weight, based on the total weight of the copolymer, of a polydialkylsiloxane shell comprising $(R_2SiO_{2/2})$ units and (c) from 5 to 95 percent by weight, based on total weight of the copolymer, of a shell comprising an organopolymer of monoolefinically unsaturated monomers.

3. The particulate copolymer of claim 1, which is composed of (a) from 5 to 95 percent by weight, based on the total weight of the copolymer, of a core polymer $(R_2SiO_{2/2})_x \cdot (RSiO_{3/2})_y \cdot (SiO_{4/2})_z$ where $x=10$ to 99.5 mol%, $y=0.5$ to 95 mol% and $z=0$ to 30 mol%, and (c) from 5 to 95 percent by weight, based on the total weight of the copolymer, of a shell comprising an organopolymer of monoolefinically unsaturated monomers.

4. A process for preparing the particulate copolymer of claim 1, which comprises (a) preparing the polysiloxane graft base by the emulsion polymerization process by metering from 0.05 to 95 percent by weight, based on the total weight of the graft copolymer, of a monomeric silane of the formula $RSi(OR')_3$ or a mixture of monomeric silanes of the formula $R_aSi(OR')_{4-a}$ where $a=0,1$ or 2, into an agitated emulsifier/water mixture, the amount of emulsifier to be employed being from 0.5 to 20.0 percent by weight, based on the amount of organosilicon compounds employed, (b) reacting the graft base, in the absence of additional emulsifier, with from 0 to 94.5 percent by weight of difunctional silanes of the general formula $R_2Si(OR')_2$ or low-molecular-weight siloxanes of the general formula $(R_2SiO_{2/2})_n$, where n is from 3 to 8, and (c) grafting the resultant graft base with from 5 to 95 percent by weight of monoethylenically unsaturated monomers by the emulsion polymerization process, in the presence of water-soluble or monomer-soluble free-radical initiators, in the absence of additional emulsifier, in which R' is an alkyl radical having 1 to 6 carbon atoms, an aryl radical or a substituted hydrocarbon radical.

5. A process for preparing the particulate copolymer of claim 2, which comprises (a) preparing the polysiloxane graft base by the emulsion polymerization process by metering from 0.05 to 90 percent by weight, based on the total weight of the graft copolymer, of a silane of the formula $RSi(OR')_3$ or a mixture of silanes of the formulas $RSi(OR')_3$ and $Si(OR')_4$, into an agitated emulsifier/water mixture, the amount of emulsifier to be employed being from 0.5 to 20.0 percent by weight, based on the amount of organosilicon compounds employed, (b) reacting the graft base, in the absence of additional emulsifier, with from 0.5 to 94.5 percent by weight of difunctional silanes of the general formula $R_2Si(OR')_2$ or low-molecular-weight siloxanes of the general formula $(R_2SiO_{2/2})_n$ where n is from 3 to 8, and (c) grafting the resultant graft base with from 5 to 95 percent by weight of monoethylenically unsaturated monomers by the emulsion polymerization process, in the presence of water-soluble or monomer-soluble free-radical initiators, in the absence of additional emulsifier, in which R' is an alkyl radical having 1 to 6 carbon atoms, an aryl radical or a substituted hydrocarbon radical.

6. A process for preparing the particulate copolymer of claim 3, which comprises (a) preparing the polysiloxane graft base by the emulsion polymerization process by metering from 5 to 95 percent by weight, based on the total weight of the graft copolymer, of a monomeric silane of the formula $RSi(OR')_3$ or a mixture of monomeric silanes of the formula $R_aSi(OR')_{4-a}$ where $a=0,1$ or 2, into an agitated emulsifier/water mixture, the amount of emulsifier to be employed being from 0.5 to 20.0 percent by weight, based on the amount of organosilicon compounds employed, and (c) grafting the resultant graft base with from 5 to 95 percent by weight of monoethylenically unsaturated monomers by the emulsion polymerization process, in the presence of water-soluble or monomer-soluble free-radical initiators, in the absence of additional emulsifier, in which R' is an alkyl radical having 1 to 6 carbon atoms, an aryl radical or a substituted hydrocarbon radical.

* * * * *